Dec. 14, 1965   D. L. GLASPIE   3,222,883
TEMPERATURE AND HUMIDITY CONTROL SYSTEMS FOR ENCLOSURES
Filed Sept. 9, 1963   5 Sheets-Sheet 1

INVENTOR.
DONALD L. GLASPIE

Dec. 14, 1965    D. L. GLASPIE    3,222,883
TEMPERATURE AND HUMIDITY CONTROL SYSTEMS FOR ENCLOSURES
Filed Sept. 9, 1963    5 Sheets-Sheet 3
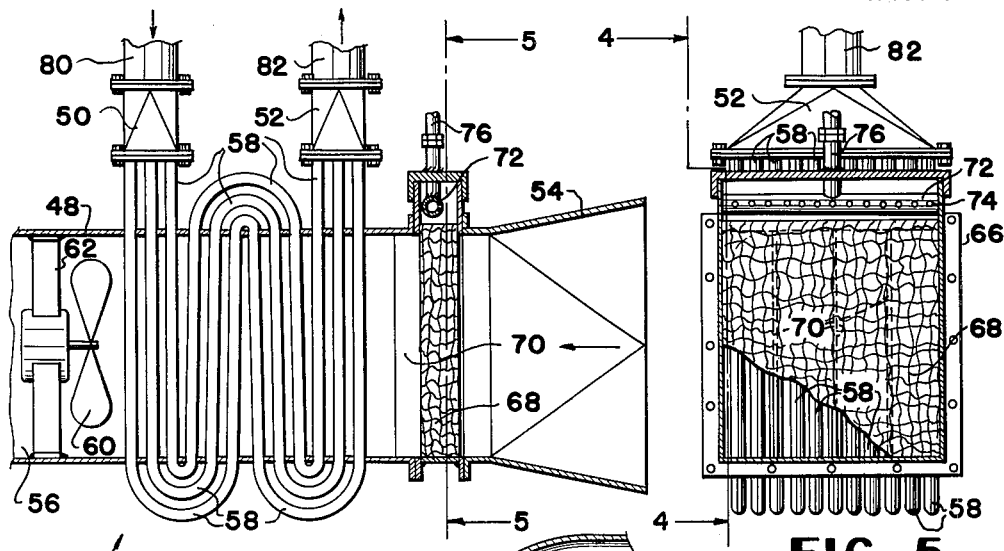
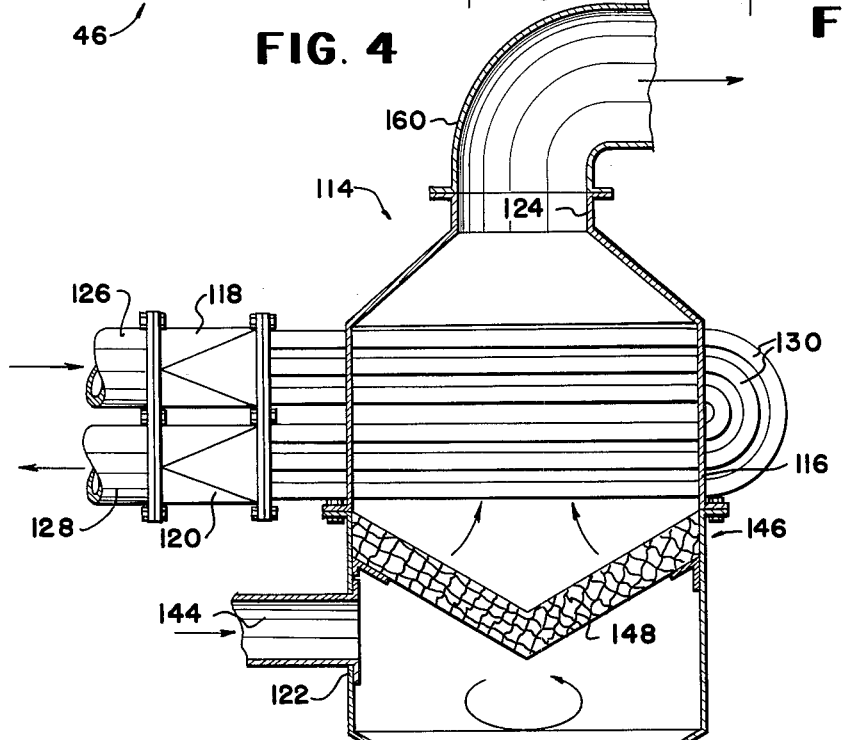
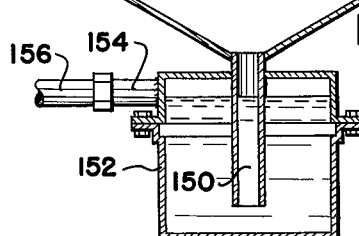
*INVENTOR.*
DONALD L. GLASPIE

INVENTOR.
DONALD L. GLASPIE
BY

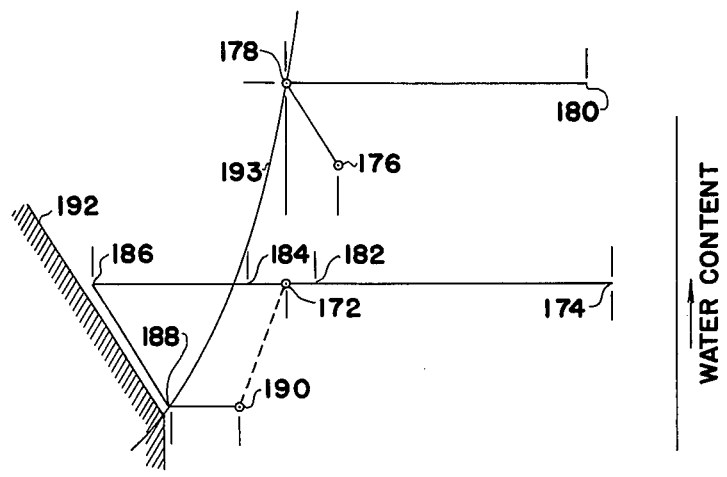
FIG. 8
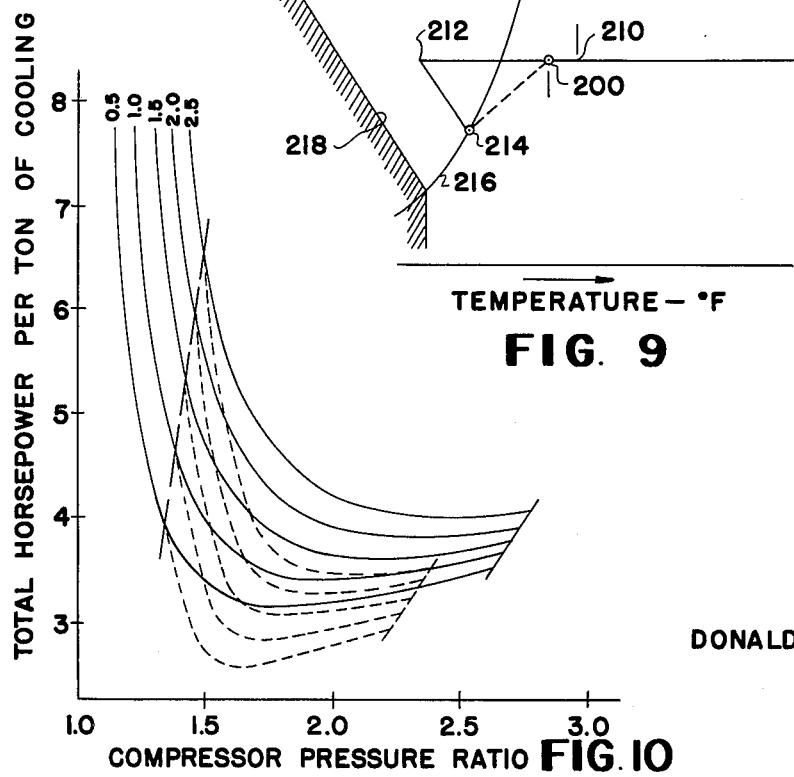
FIG. 9
FIG. 10
INVENTOR.
DONALD L. GLASPIE

United States Patent Office 3,222,883
Patented Dec. 14, 1965

3,222,883
TEMPERATURE AND HUMIDITY CONTROL
SYSTEMS FOR ENCLOSURES
Donald L. Glaspie, New Orleans, La., assignor to The Boeing Company, Wichita, Kans., a corporation of Delaware
Filed Sept. 9, 1963, Ser. No. 307,687
15 Claims. (Cl. 62—172)

This invention relates to method and means for conditioning and/or controlling the condition of gaseous fluids. In a more specific aspect, this invention relates to temperature and/or humidity control systems for enclosures or the like. In yet a more specific aspect, the invention relates to air cycle systems for controlling the temperature, pressure and humidity of a gaseous fluid being supplied to an enclosure or the like. In a further aspect, the invention relates to methods and means for controlling temperature or humidity of a gaseous fluid supplied to an enclosure or the like wherein mixing from two different sources occurs upstream of expansion of the gaseous fluid.

Means for conditioning air or other gaseous fluids are known to the art, including so-called vapor cycle units used for cooling air or other gases and wherein a coolant, such as Freon, is compressed and expanded during the operating cycle to provide the cooling fluid with heat being removed from an air stream passing in heat exchange relation with the vapor. Size, weight, complexity of equipment, maintenance expense and other limitations makes such vapor cycle systems undesirable in many instances. Air cycle air-conditioning systems are known to the art and in some of the prior art devices mixing of air from two separate sources occurs downstream from expansion of the air to provide temperature and/or humidity control. In other instances, attempts have been made to control humidity of the system at the inlet of the system. The prior art systems of the air cycle type have not provided satisfactory temperature and humidity control due to the manner and control of the mixing of fluids to be supplied to an enclosure.

In accordance with the present invention, many deficiencies and disadvantages of prior art structures have been overcome. The new means to condition gaseous fluid of the invention includes heat exchange means and means operatively connected to the heat exchange means operable to provide gaseous fluid under pressure thereto. Mixing means are operatively connected to the outlet of the heat exchange means, and it has means connectible to means for providing gaseous fluid under pressure to the mixing means with the mixing means being operable to mix gaseous fluid streams. Expansion means are operatively connected to the outlet of the mixing means and are operable to receive gaseous fluid therefrom and expand same and decrease the temperature and pressure thereof. Means are operatively connected to the outlet of the expansion means to receive gaseous fluid therefrom.

In accordance with the new method of conditioning gaseous fluid of the invention, a gaseous fluid is compressed to increase the temperature or pressure thereof and the resulting compressed gaseous fluid is mixed with other gaseous fluid to change the temperature thereof. Subsequently, the resulting gaseous fluid is expanded to decrease the temperature and pressure thereof.

It is an object of the invention to provide new method and means for conditioning and/or controlling the condition of gaseous fluids.

It is another object of this invention to provide new method and means for controlling the temperature and humidity of gaseous fluids to be provided to an enclosure, or the like.

Another object of the invention is to provide new method and means for conditioning the temperature and humidity of air or other gaseous fluids for supplying same to an enclosure wherein the system has a minimum of moving parts and requires very little maintenance.

Another object of the invention is to provide a new method and means for temperature and/or humidity control wherein mixing of a gaseous fluid to be provided to an enclosure or the like occurs upstream of expansion of the gaseous fluid.

Another object of the invention is to provide new method and means for temperature control of a gaseous fluid wherein mixing of the fluid occurs upstream of expansion thereof and removal of water from the air occurs downstream of the expansion of the gaseous fluid.

Another object of the invention is to provide new air conditioning means for use as a ground support unit for aircraft or the like.

A still further object of the invention is to provide an integral unit or system for providing heating, cooling, humidity control, pressurization, and electric power.

Various other objects, advantages and features of the invention will be apparent to those skilled in the art from the following description taken in connection with the accompanying drawings, in which:

FIG. 4 is a longitudinal cross section view taken along the line 4—4 of FIG. 5 showing the heat exchanger of FIG. 1.

FIG. 5 is a transverse cross section view taken along the line 5—5 of FIG. 4.

FIG. 6 is an enlarged cross section view through the water separator, and reheat heat exchanger and water trap of the system of FIG. 1.

FIG. 8 is a psychrometric chart illustrating operation of a temperature and humidity control system of the invention.

FIG. 9 is another psychrometric chart showing operation of another temperature and humidity control system of the invention.

FIG. 10 is a diagram showing and teaching what could be obtained by use of a water evaporator in the systems of the invention.

Figure 1:
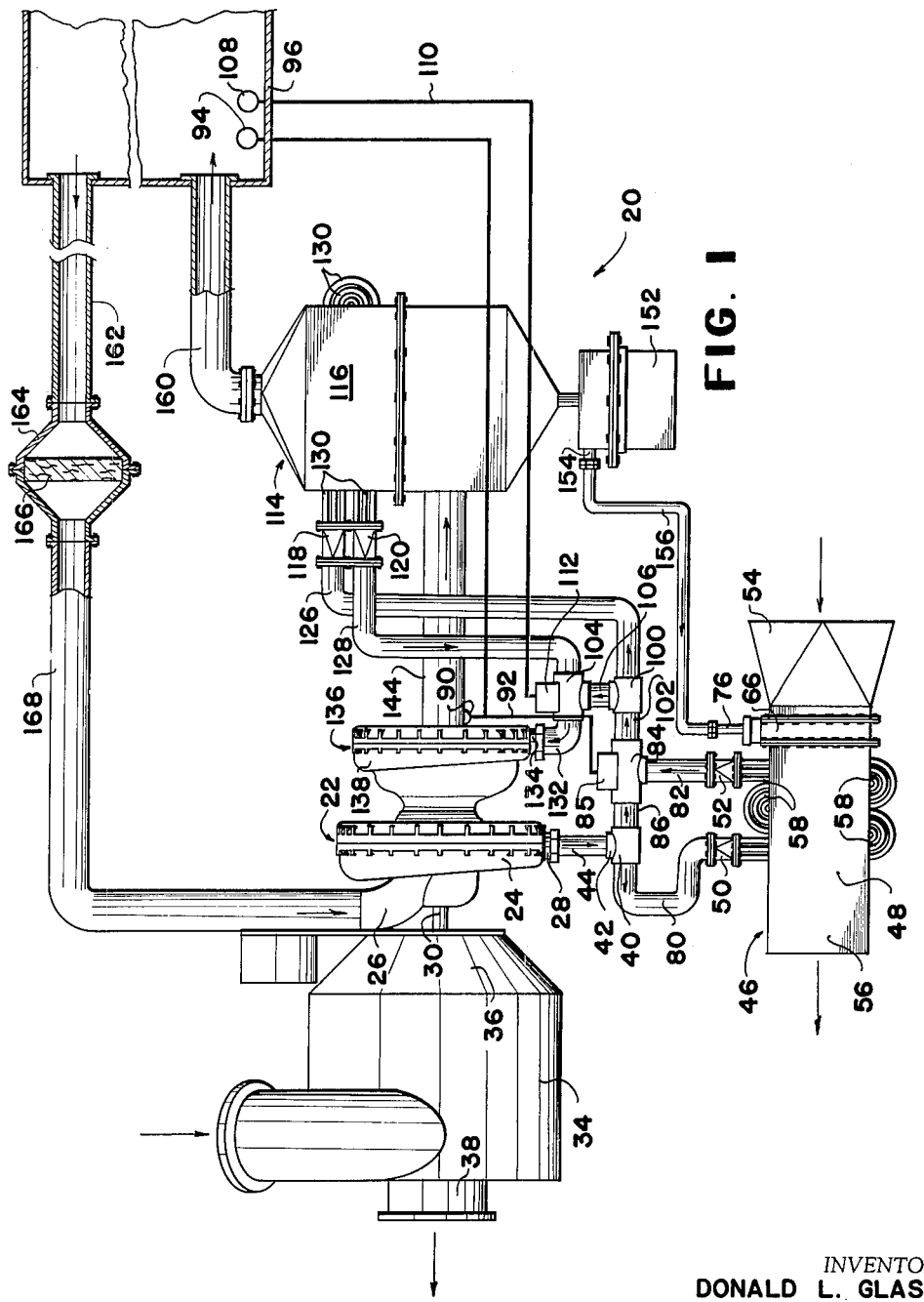
FIG. 1 is a view of a preferred specific embodiment of a temperature and humidity control system of the invention.

The following is a discussion and description of preferred specific embodiments of the new temperature and humidity control systems and methods of the invention, such being made with reference to the drawings whereon the same reference numerals are used to indicate the same or similar parts and/or structure. It is to be understood that such discussion and description is not to unduly limit the scope of the invention.

Figure 2:
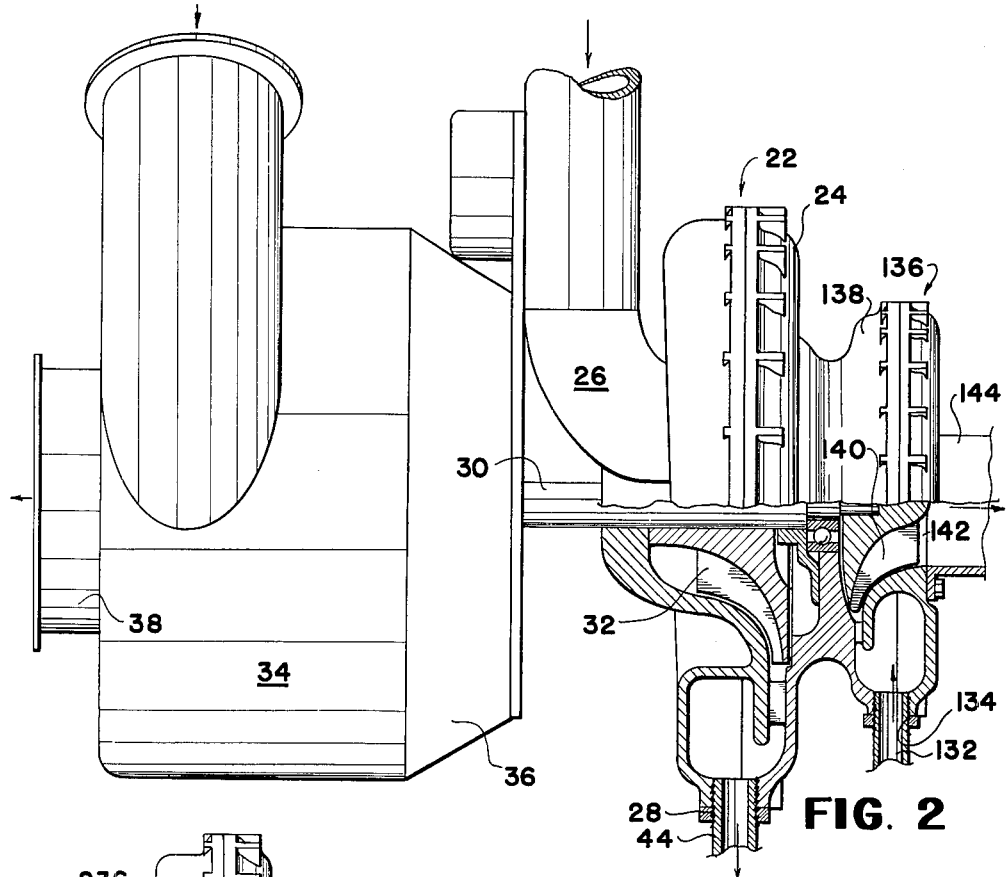
FIG. 2 is an enlarged view, partially in cross section, of the power means, compressor and turbine of the system of FIG. 1.

Referring now to the drawings in detail, a preferred specific embodiment of the new temperature and humidity control system for enclosures or the like is illustrated generally at 20 in FIGURE 1 and includes a compressor 22 having a hollow housing 24 with an air inlet 26 and an air outlet 28. A shaft 30 is provided and is positioned centrally in the housing 24 and rotatably mounted therein in any suitable manner. The shaft 30 desirably extends from each side of the compressor housing 24 as best illustrated in FIG. 2. A plurality of compressor impellers or vanes 32 are provided and are connected to the shaft 30 for rotation therewith. The impellers or vanes 32 are preferably shaped and positioned to receive air or other gaseous fluid from the inlet or suction side 26 of compressor 22 and compress same within the housing 24 and discharge the compressed air or other gaseous fluid through the outlet 28 thereof.

Suitable power means are preferably connected to one end portion of the shaft 30 to rotate same in operation. As illustrated in FIGS. 1 and 2 the power means is a common gas turbine engine shown generally at 34 which has an air inlet portion 36 and an exhaust portion 38 with the engine 34 being operable to receive air and a fuel for combustion therein to cause rotation of the shaft 30. Use of a gas turbine as the power means 34 is quite desirable, since the speed of rotation of the shaft of the gas turbine is often such that it can be directly coupled to the compressor shaft. In other instances, suitable pulley and belt and or meshing gears, or the like, gearing or transmission means can be used to operatively connect the shaft 30 to the power means.

A first T-shaped coupling member 40 is provided and has an inlet 42. A pipe or conduit 44 is connected in its end portions to the outlet 28 of compressor 22 and to the inlet 42 of the coupling 40. A heat exchanger 46 of any suitable construction is provided and in the preferred embodiment illustrated in the drawings and best shown in FIGS. 4 and 5, the heat exchanger includes a tubular or hollow portion 48 which forms a low pressure passageway. A high pressure air inlet or header 50 and a high pressure air outlet or header 52 are positioned intermediate the ends of the tubular or hollow portion 48. The low pressure air inlet 54 can be flared outwardly or enlarged as illustrated and the low pressure fluid leaves the low pressure side of the heat exchanger through the outlet end portion 56.

A plurality of conduits or tubes 58 are provided and each are connected in one end portion to the high pressure air inlet or header 50 and connected in the other end portion to the high pressure air outlet or header 52 with the intermediate portions of the tubes 58 being positioned across the intermediate portion of the tubular or hollow member 48. Preferably, a fan 60 is provided and is mounted on suitable supports 62 in the outlet and portion 56 of tubular member 48 and in operation the fan 60 drops cooling air into the inlet 54 and through the tubular or hollow portion 48 of the heat exchanger and discharges same from the end portion 56 thereof with the air passing around tubes 58 and thus cooling compressed air passing through the tubes 58.

In order to increase cooling of the compressed air in the heat exchanger, means are preferably provided to cool air entering the inlet portion 54 of the tubular member 48. For this purpose a water evaporator 66 can be provided as best illustrated in FIGS. 4 and 5 and includes a mat or layer of fibrous material or other suitable loose material shown at 68 and held in place by suitable frame members 70. The material 68 is preferably sufficiently loose or porous so that water passing therethrough is easily evaporated by air drawn through the mat by the fan 60. A pipe or tubular conduit 72 is provided at the upper portion of the evaporator 66 and has a plurality of holes or openings 74 therealong so that water received by the conduit or pipe 72 is discharged onto the upper edge or side of the material 68. Tubular conduit 72 is connected by another tube or conduit 76 to a source of water.

FIG. 10 of the drawings illustrates graphically the advantages of using evaporation means such as shown at 66. The curves shown in solid lines illustrate the pressure drop in the heat exchangers of various systems wherein no evaporation is utilized and the dashed lines indicate curves for the same or similar systems wherein evaporation is utilized in the heat exchanger 46 to cool low pressure air passing therethrough. As will be apparent from FIG. 10, for any given compressor pressure ratio, the total horsepower required per ton of cooling is significantly less when evaporation is utilized.

The high pressure air inlet or header 50 of the heat exchanger 46 is preferably connected to one of the outlets of the T-shaped coupling 40 by a conduit 80 and the high pressure outlet or header 52 of the heat exchanger is connected by a conduit 82 to one of the inlets of a mixing valve 84. The other inlet of the mixing valve 84 is connected by a conduit 86 to the other outlet of the T-shaped coupling 40 so that gaseous fluids from two separate sources and having different temperatures can be provided to the valve 84 for mixing therein. Preferably, the valve 84 is of the type which is constructed to pass gaseous fluids therethrough either entirely from the T-shaped coupling 40, entirely from the outlet 52 of the high pressure side of the heat exchanger 46, or to mix air from the T-shaped coupling 40 and the outlet 52 of the heat exchanger. Desirably, the valve 84 is automatically controlled by a thermostat device having a heat sensing element 90 which is operatively connected to a control portion 85 of the valve 84 by conductor 92, and adjustment can be made for opening and closing the valve at a given temperature of the heat sensing element 90 by adjustment of a portion 94 of the thermostat which is positionable within an enclosure or the like 96 to be conditioned by the apparatus of the invention. The thermostat structure can be of any suitable type commercially available.

Another T-shaped coupling 100 is preferably provided and the inlet of the coupling 100 is connected by a conduit or tube 102 to the outlet of the mixing valve 84. A second mixing valve 104 is provided and one inlet of the mixing valve 104 is connected by conduit or tube 106 to an outlet of the coupling 100.

Preferably, means are provided to automatically control the second mixing valve 104. For this purpose, a humidistat or other suitable humidity sensing means is provided which has a humidity sensing element 108 positionable in the enclosure 96 to be conditioned and connected by conductor 110 to the control portion 112 of the valve 104.

Desirably, a reheat heat exchanger is provided for controlling the humidity of the air or other fluid being supplied to the enclosure 96. The reheat heat exchanger is shown generally at 114 and, as best illustrated in FIG. 6, includes a tubular or hollow housing portion 116 having a high pressure inlet or header 118 and a high pressure outlet or header 120 at an intermediate portion thereof and a low pressure air inlet 122 and a low pressure air outlet portion 124 at the end portions thereof. The high pressure air inlet or header 118 is preferably connected by conduit or tubing 126 to the other outlet of the second T-shaped coupling 100, and the outlet header 120 is connected by tubing or pipe 128 to the other inlet of the second mixing valve 104.

A plurality of air tubes or conduits 130 are provided and positioned in the hollow portion 116 of the reheat heat exchanger 114, and each of the tubes or conduits 130 has the inlet end thereof operatively connected to the inlet or header 118 with the outlet thereof being operatively connected to the outlet or header 120 so that gaseous fluid from coupling 100 passing through conduit 126 and into header 118 is provided to the tubes or conduits 130 for circulation therethrough and passage into the header 120 and through conduit 128 to the second mixing valve 104. Gaseous fluid received and the inlets of mixing valve 104 is mixed in accordance with the humidity conditions in enclosure 96 as sensed by the humidity sensing element or member 108 and the outlet of the mixing valve 104 is connected by a conduit 132 to the inlet 134 of suitable expansion means such as an expansion turbine 136. The turbine 136 has a hollow housing 138 and preferably the housing 138 of the turbine is made integral with and merges into the housing 24 of the compressor 22 as best illustrated in FIG. 2. The end portion of shaft 30 desirably projects into the housing 138 of the turbine and a plurality of turbine impellers or blades 140 are mounted on the shaft 30 to turn therewith.

In operation, air or other gaseous fluids under pressure from the second mixing valve 104 pass through conduit 132 and into the air inlet 134 into the housing 138 of the turbine where they engage the impellers or blades 140 to cause rotation of shaft 30 and assist the power means 34 in turning the shaft 30 for operation of the compressor 22. Passage of air or other gaseous fluids passing through the expansion turbine 136 lowers the temperature and pressure of the gaseous fluid and the cooled air enters the conduit or tube 144 which is connected to the inlet 122 of the reheat heat exchanger. Preferably, the heat sensing element 90 of the thermostat which controls operation of the mixing valve 84 is positioned in the conduit or tube 144 at the outlet 142 of the expansion turbine 136.

Means are preferably provided downstream of the turbine 136 to remove water or moisture from the air leaving the turbine 136. In the preferred embodiment illustrated in the drawings a water separator 146 is provided and, as best illustrated in FIG. 6, can be positioned in the lower portion of the tubular or hollow portion 116 of the reheat heat exchanger with the water separator including a conical or V-shaped mat or element 148 which can be of steel wool or other suitable material. As the air from conduit 144 enters the low pressure inlet 122 of the reheat heat exchanger 114 and passes through the element 148 moisture or water in the air condenses on the element 148 and collects thereon and eventually drop to the bottom of the hollow member 116 where the water flows in a conduit or pipe 150 and into a water trap 152 of any suitable construction.

The water trap 152 desirably has an outlet 154 at an upper portion thereof to discharge water from the trap 152. Preferably, a pipe 156 is connected to the outlet 154 of the water trap and to the inlet 76 of the water evaporator so that water removed from air passing through the water separator is transferred through the water trap 152 and pipe 156 to the water evaporator for evaporation therein and cooling of air passing through the low pressure side of the heat exchanger 46. This utilization of the water removed from the air to be provided to the enclosure to be conditioned has been found quite effective and substantially increases the efficiency of the system as illustrated in FIG. 10 and described hereinbefore.

After air to be provided to the enclosure 96 passes through the water separator element 148 it is directed around the tubes or conduits 130 containing the high pressure gaseous fluid of the reheat heat exchanger 114 and the low pressure air is thus warmed somewhat so that the relative humidity thereof is less than the cooler air immediately above the water separator element 148 and beneath the conduits 130. The air is then conditioned and can be passed through the outlet 124 of the reheat heat exchanger 114 and into a tube or conduit 160 which is connected in fluid communication with the enclosure 96 to discharge the air thereinto.

Air from the enclosure 96 can be recirculated through the system if desired. For this purpose, a conduit or tube 162 is connected in its end portions to the enclosure 96 and preferably to a filter unit 164 having a filter element 166 therein operable to remove dust and other particles from the air passing therethrough. Another conduit 168 is connected in its end portions to the filter unit 164 and to the inlet 26 of the compressor 22 to provide a closed system. As an alternative, the air leaving enclosure 96 can be discharged to the atmosphere or into heat exchanger inlet 54 and atmospheric air can be drawn into the inlet 26 of the compressor 22.

In operation of the system illustrated in FIG. 1, the power means 34 causes rotation of the shaft 30 to operate the compressor 22. Rotation of the shaft 30 and the blades 32 attached thereto creates a suction at the inlet side 26 of the compressor 22 to draw air or other fluid thereinto and the compressor compresses the fluid and discharges same therefrom at an increased temperature and pressure. The compressed air is provided to coupling 40 and can be transferred therefrom through the heat exchanger 46 for cooling in the tubes 58 therein or transferred directly to the mixing valve 84. Mixing valve 84 operates in response to the temperature conditions at the heat sensing element 90 positioned at the outlet of the turbine 136 to open the valve 84 to receive fluid only from the coupling 40, only from the heat exchanger outlet 52, or partially from both the coupling 40 and heat exchanger outlet 52 to provide mixing of air therefrom with the air being discharged from the mixing valve 84 to the coupling 100. From coupling 100 air or other fluid is provided to the high pressure side of the reheat heat exchanger 114 and to the second mixing valve 104. The second mixing valve is operable in response to humidity conditions in the enclosure 96 to pass air or other fluids only from the first mixing valve 84, only from the reheat heat exchanger high pressure side, or a mixture of fluids from both of these sources. Fluid from the mixing valve 104 is provided to the turbine 136 where the air is expanded which results in a decrease in the temperature and pressure of the air. The air is then transferred to the water separator 146 for removal of moisture therefrom with the water removed from the air being transferred through water trap 152 to the water evaporator 66 for evaporation therein which substantially improves the operation of the heat exchanger 46. Air from the water separator then passes through the low pressure side of the reheat heat exchanger where it is warmed by passing around conduits 130 and the conditioned air can then be supplied to the enclosure 96 by conduit 160 or other suitable means.

FIG. 8 of the drawings illustrates by a psychrometric chart the changes which occur in the temperature and water content of the air or other fluid being supplied to the enclosure 96 as it passes through various stages of the conditioning means of the invention shown in FIG. 1. Assuming that the temperature of the air entering the inlet 26 of the compressor 22 has the temperature and water content illustrated on the diagram at 172, the air is heated as a result of compression in the compressor 22 and when it leaves the compressor 22, it will be at a temperature indicated on the diagram or chart at 174.

Assuming an ambient air condition of the air entering inlet 54 of heat exchanger 56 is that illustrated at 176 on the chart, then as the air passes through the heat exchanger 46 low pressure side thereof, it receives water from evaporator 66 and is cooled and the temperature and water content of the air leaving the evaporator is shown at 178. As this air passes around the tubes or conduits 58 containing the heated and compressed air, the air in the low pressure side of heat exchanger 46 is heated from the condition illustrated at point 178 to the temperature shown at point 180.

The heat removed by the air in the low pressure side of the heat exchanger reduces the temperature of the air in the high pressure side thereof from the condition illustrated at 174 on the chart to the condition illustrated at 182 and further cooling of the air occurs in the reheat heat exchanger 114 to lower the temperature to the condition illustrated at 184. Further cooling of the air to be provided to the enclosure occurs in the turbine 136 and lowers the temperature of the air to the condition indicated at 186 which is slightly above the freezing condition indicated by line 192.

The water content of the air passing through the water separator is lowered and results in warming of the air so that the air leaving the filter element 148 of the water separator is at the temperature and water content conditions illustrated at 188. As this air passes through the low pressure side of the reheat heat exchanger 114, additional heat is supplied to the air from the conduits or pipes 130 and the air leaves the reheat heat exchanger low pressure side at the temperature and water content conditions indicated at 190. The difference in temperature and water content between points 190 and 172 in FIG. 8 represents the capacity of the system for cooling and dehumidification. In selecting operating conditions for a specific application, it is desirable that the point 186 is to the right or on the warm side of the freezing condition line 192 to prevent freezing of the water in the air as it leaves the turbine 136. Line 193 is the air-water saturation line.

In order to further explain operation of a specific embodiment of the apparatus as shown in FIG. 1, and assuming air entering the suction side of the compressor at a temperature of approximately 100 degrees F., and 14.7 p.s.i.a., the compressor will compress the air and increase the temperature and pressure thereof and discharges same at approximately 230 degrees F., and at about 30 p.s.i.a. Assuming air entering the low pressure side of the heat exchanger 46 at approximately 100 degrees F., the air passes through the water evaporator and is cooled to approximately 60 to 70 degrees F., and as it passes across the tubes or conduits 58, the air in the low pressure side of the heat exchanger is heated to approximately 170 to 180 degrees F. This heat transfer reduces the temperature of the air in the high pressure side of the heat exchanger so that same leaves the heat exchanger at approximately 80 to 85 degrees F., and this air can be mixed with air directly from the compressor by valve 84.

The air from valve 84 can be provided to the reheat heat exchanger where it is cooled by approximately 25 to 35 degrees F., and is provided to the mixing valve 104 for mixing therein with air from the valve 84. The pressure and temperature of the air passing through the turbine is reduced by approximately 75 to 85 degrees F., and leaves the turbine at a pressure of about 14.8 p.s.i.a. As the air passes through the water separator, the water content in the air is reduced from about 90 to 100 grains of water per pound of dry air to approximately 25 to 35 grains per pound of dry air and the air is also heated about 35 to 50 degrees F. As the air passes through the reheat exchanger, it is warmed 25 to 35 degrees F., and leaves the reheat heat exchanger at a pressure of about 14.7 p.s.i.a. Operation of the mixing valves will regulate the temperature and water content of the air supplied to the enclosure. The specific data set forth hereinbefore is intended to illustrate and not to unduly limit the scope of the invention.

In some instances, the reheat heat exchanger 114 is not necessary, and the air from the compressor can be provided through the heat exchanger 46 and/or provided directly to the mixing valve 84 and supplied therefrom directly to the expansion turbine 136. This can be accomplished either by removal of the reheat heat exchanger or by regulation of the mixing valve 104 to bypass the reheat heat exchanger. FIG. 9 is a psychrometric chart illustrating the operation of such a system. Assuming the ambient air entering the compressor is at the temperature and water content indicated by 200, the air is heated in the compressor to increase the temperature thereof to the condition indicated at 202 in the psychrometric chart and then passes through the heat exchanger 46. Assuming the air in the low pressure side of the heat exchanger enters at a temperature and water content indicated at 204, the air is cooled by the water evaporator and additional water is added to the air stream so that the water leaving the evaporator has the temperature and water content indicated at 206 with this air being heated as it passes through the heat exchanger to a temperature and water content indicated at 208. This passage of cooling air through the low pressure side of the heat exchanger decreases the temperature of the air in the high pressure side thereof from the condition indicated at 202 to the condition indicated at 210. This air is then provided to the expansion turbine 136 which expands the pressurized air to result in cooling thereof to the temperature condition indicated at 212. As the cooled air passes through the water separator the water content is lowered and the temperature is increased so that the air leaving the water separator and available for supplying to the enclosure is at the temperature and water content conditions indicated at 214 in FIG. 9. The total capacity for the system for cooling the enclosure is the difference in temperature and water content between the points 214 and 200 in the chart in FIG. 9. In the example illustrated in FIG. 9, the air supplied to the enclosure is substantially at the air-water saturation line 216 and warmer in temperature than the freezing condition line 218. A comparison of FIGS. 8 and 9 illustrates the desirable features of the reheat heat exchanger in providing humidity control and indicates that this equipment is most desirable where humidity of the ambient air is high and control thereof is very desirable.

Figure 3:
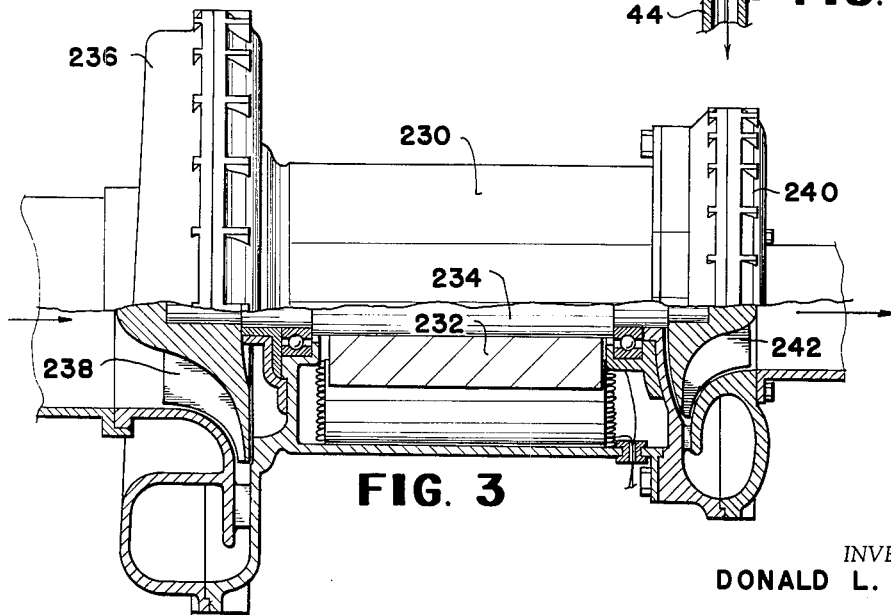
FIG. 3 is an enlarged view, partially in cross section, showing a modified form of turbine and compressor constructions.

In the specific embodiment of the invention illustrated in FIG. 1 a gas turbine engine is used for the power means, however, other means for driving the compressor can be used. Such means are illustrated in FIG. 3 of the drawings where an electric motor 230 is shown and has a rotor 232 connected to a shaft 234 which extends from both ends of the motor. A compressor 236 of suitable and common construction is provided and has impellers or vanes 238 mounted on one end of shaft 234 for rotation therewith. An expansion turbine 240 is positioned at the other end of the motor 230 and has a plurality of vanes or the like 242 connected to the other end of shaft 234 and in operation work is done on the turbine by air passing through the turbine 240 which aids motor 230 in operation of the compressor 236. Various other power means can also be used, if desired.

Figure 7:
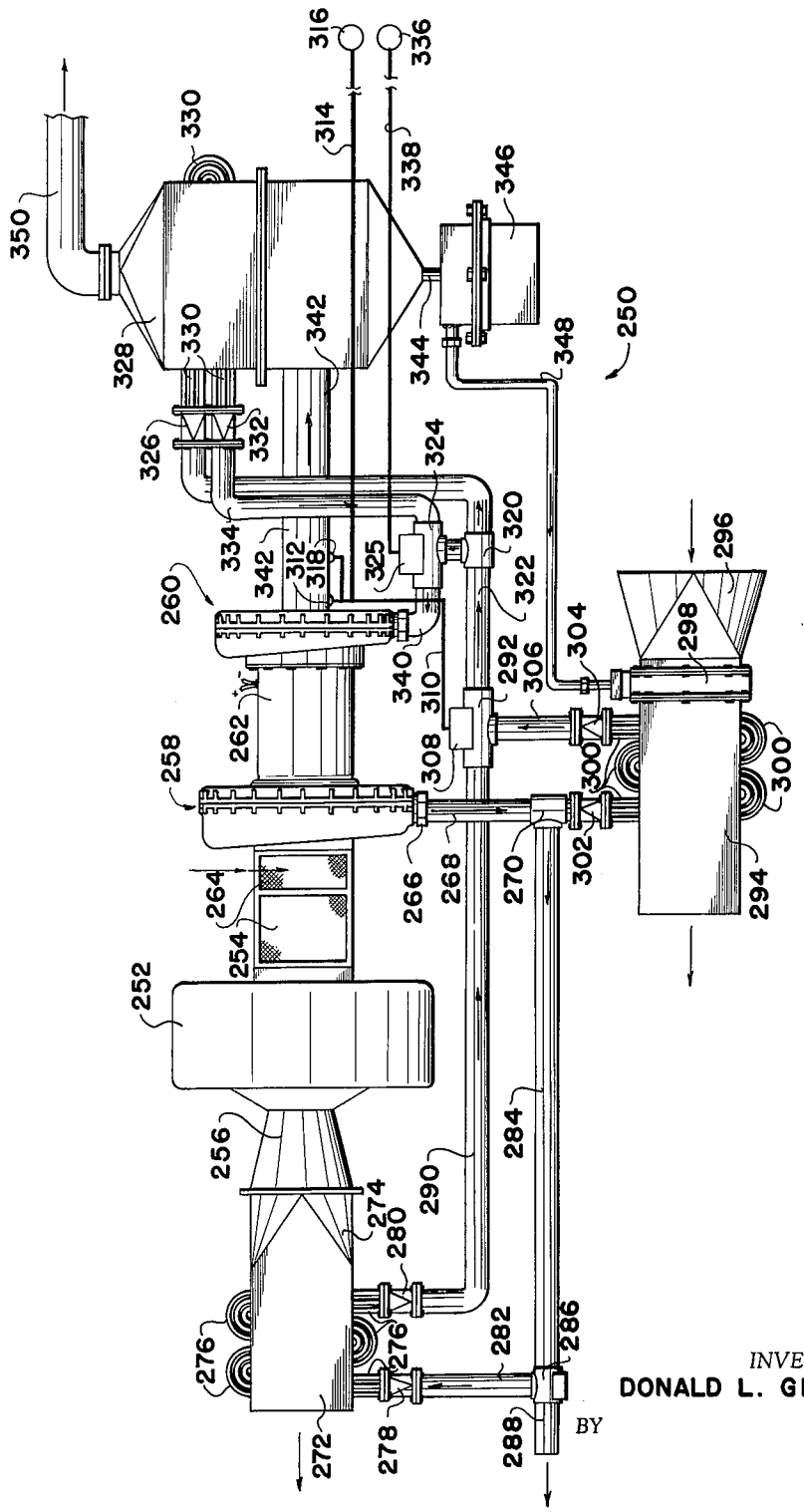
FIG. 7 is a view of another preferred specific embodiment of the temperature and humidity control system of the invention adapted for use as a ground support unit for aircraft.

Another preferred specific embodiment of the invention is illustrated in FIG. 7 of the drawings and in this embodiment heating, cooling, pressurization, humidity control and generation of electrical energy is provided by the system or apparatus illustrated. The system is shown generally at 250 and includes power means 252, such as a gas turbine or the like, which has an air inlet 254 and an outlet 256 for exhaust gases. The system further includes a compressor 258 and expansion turbine 260 having positioned therebetween an electrical generator 262 of suitable construction and preferably the compressor 258, generator 262 and turbine 260 are mounted on the same shaft for rotation together and this shaft can be coupled to the power or drive shaft of the engine or power means 252 in any suitable manner, such as in the manner illustrated in FIG. 2 of the drawings. The compressor 258 has an air inlet 264 to provide air to the suction side of the compressor and the outlet 266 of the compressor is connected to one end portion of a conduit or pipe 268 which is connected in the other end portion to an inlet of a T-shaped coupling 270.

A heat exchanger 272 is provided and has a tubular or hollow portion with the inlet end 274 thereof being positioned at the exhaust outlet 256 of the engine 252 to receive hot exhaust gases therefrom and pass same through the low pressure side of the heat exchanger 272. The heat exchanger 272 has a high pressure side including a plurality of conduits or tubes 276 which pass through the hollow portion of the heat exchanger and are connected in their end portions to a high pressure inlet or header 278 and a high pressure outlet or header 280. The air inlet or header 278 is operatively connected in fluid communication to one of the outlets of the T-shaped coupling 270 by pipes or conduits 282 and 284 and through a valve 286. Preferably another conduit or pipe 288 is connected in one end to the valve 286 so that the valve can be adjusted to provide hot compressed air or gas from the compressor 258 and conduit or pipe 284 to conduit 288 with this air being used as bleed air for starting power of aircraft or for other desired functions. When heating of the system is desired, the valve 286 is closed to pass hot compressed air or gas through conduit or pipe 284 into pipe 282 to the heat exchanger 272. The outlet or header 280 of the high pressure side of the heat exchanger 272 is connected by pipe or conduit 290 to an inlet of a mixing valve 292.

A second heat exchanger 294 is provided and can be the same or similar in construction as that illustrated in FIGS. 4 and 5 of the drawings. The heat exchanger 294 has a low pressure air inlet portion 296 through which air can enter the low pressure side as indicated by the arrows and passes through a water evaporator 298 and around a plurality of tubes or conduits 300 positioned in the hollow portion of the heat exchanger 294. Passage of air therethrough can be facilitated by a blower fan or the like as illustrated and described in connection with FIG. 4. A high pressure air inlet or header 302 is connected in fluid communication with the other outlet of the T-shaped coupling 270 and the high pressure air outlet or header 304 of the heat exchanger is connected by a conduit or pipe 306 to the other inlet of the mixing valve 292.

The mixing valve 292 is constructed and operable to receive and pass therethrough air under pressure from heat exchanger 272 alone, from the heat exchanger 294 alone, or to mix air from these two sources and pass same therefrom at the desired temperature.

Means are preferably provided to automatically control operation of the mixing valve 292 and such can be done in the same or similar manner to that previously described in connection with FIG. 1. More specifically, the valve 292 can have a control portion 308 connected by a conductor 310 to a heat sensing element 312 positioned at the outlet of the turbine 260 with the heat sensing element and control portion 308 being further connected by conductor 314 to a thermostat element 316 positioned in the enclosure to be conditioned with adjustment being made at the portion 316 to regulate valve 292. If desired, a second heat sensing element 318 can be provided and positioned at the outlet of the turbine 260 so that both high and low temperature limiting means can be provided for operation of valve 292 and thus prevent excessively high or low temperatures at the outlet of the turbine 260. Use of high and low temperature heat sensing means can also be used with the embodiment shown in FIG. 1.

The outlet of a mixing valve 292 is connected to a second T-shaped coupling 320 by a tube or conduit 322. From the T-shaped coupling 320 air is provided to a second mixing valve 324 and to the inlet or header 326 of a reheat heat exchange 328 which can be of the same or similar construction to that illustrated in FIG. 6. The air from inlet or header 326 passes through the tubes to conduits 330 of the high pressure side of the reheat heat exchanger 328 and into the outlet or header 332 and through pipe or conduit 334 to the other inlet of the mixing valve 324.

Mixing valve 324 is preferably controlled by suitable humidity sensing means, such as a humidistat 336 positionable in the enclosure to be conditioned and connected by conductor 338 to the control portion 325 of the mixing valve 324. The outlet of the mixing valve is connected by conduit or pipe 340 to the inlet of the turbine 260 which can be of the same or similar construction to that previously described with air passing through the turbine 260 being expanded and doing work on the turbine. The temperature and pressure of the air passing through the turbine is decreased and the air is discharged into one end of the pipe or conduit 342. The other end of the pipe or conduit 342 is connected to the housing of the water separator and the reheat heat exchanger 328. The air then passes through a water separator of suitable construction, such as that shown and described in connection with FIG. 6. Water from the separator is removed through the pipe 344 and delivered to a water trap 346 and removed therefrom by a conduit 348. Conduit 348 is preferably connected to the water evaporator 298 in the heat exchanger 294.

Air leaving the water separator passes through the low pressure side of the reheat heat exchanger 328 and enters a pipe or conduit 350 provided to transfer the conditioned air to an enclosure. During operation of the system, the generator 262 will provide a source of electric power or current for any suitable use.

The system 250 of FIG. 7 is constructed and adapted so that heating, cooling, pressurization, humidity control, and electric current can be provided for any suitable application. The system of FIG. 7 can be used as a heating and air-conditioning system for a building or the like with electric current from generator 262 being used for lighting or other electrical use in the building. When utilized in this manner, the power means 250 can be directly coupled to an electrical generator of sufficient capacity to provide both the electrical power to the building being conditioned and to operate a motor or the like used for driving a compressor for the air-conditioning system, such as the motor, compressor and turbine combination shown in FIG. 3. The system 250 is also quite desirable for use as a ground control unit for aircraft and the like where it is desirable to provide heating and/or cooling as well as electrical power to the aircraft while it is stationary on the ground, during starting and the like. In this instance, the valve 286 can be opened to pipe 288 to provide starting power or air pressure for jet engines and the like.

When compared to commonly available ground support units for use with aircraft and the like, the system of FIG. 7 requires less horsepower per ton of cooling and is substantially lighter in weight than present Freon type systems. For example, a commonly available system known as the Hokanson Model 555, sold by C. G. Hokanson Co., Inc., of Los Angeles, California, which includes a blower with 32 horsepower engine drive at 2900 r.p.m., a Freon compressor with 37 horsepower engine drive at 1900 r.p.m. and a system assembly capable of producing 11.5 tons of cooling at 80 pounds per minute air flow from 100 degrees F., dry bulb and 76 degrees F. wet bulb to 45 degrees F. dry bulb and discharge this air at approximately 3.0 p.s.i.g. The system has a weight of approximately 7000 pounds including the cart or trailer. Depending upon the design criteria for the system of FIG. 7, the power required will vary from approximately 3.5 to 5 horsepower per ton of cooling capacity while the conventional system requires approximately 6 horsepower per ton. Thus, a substantial savings in horsepower requirements or power requirements is obtained by the system of FIG. 7 where total cooling capacity is substantial as in these ground support units. In addition, there is a substantial savings in overall weight of the system of FIG. 7 in comparison with the Hokanson systems. The estimated weight of the system of FIG. 7 is illustrated in the following table:

*Table I*

| Equipment: | Approximate weight/lbs. |
|---|---|
| Air cycle unit only (80#/min. air flow) | 30.0 |
| Main intercooling heat exchange and evaporator 80#/min. hot air flow—Aluminum 98#/min. ambient air flow | 120.0 |
| Water separator | 20.0 |
| Reheat coil (aluminum) | 30.0 |
| Exhaust heat exchanger | 50.0 |
| Air filter bank | 20.0 |
| Ambient air blower | 20.0 |
| 2 3-way modulating valves | 20.0 |
| Solar T-63 gas turbine | 70.0 |
| Ducts, panels, brackets | 120.0 |
| Total | 500.0 |
| Trailer bed, frame and wheels | 1000.0 |
| Total weight on trailer | 1500.0 |

In comparison, the Hokanson Model 555 ground air conditioning truck has a weight of approximately 7000 pounds. The system of FIG. 7 referred to in comparison to the Hokanson model is designed to provide approximately 80 pounds per minute air flow supplied at 3 p.s.i.g. with the total horsepower for cooling of approximately 45 to 47 horsepower at 100 degrees dry bulb and 76 degrees wet bulb ambient air temperature. The cooling capacity is approximately 9.3 tons with the temperature being supplied to the enclosure at about 45 degrees dry bulb and 43 degrees wet bulb. The total horsepower for heating is approximately 46 horsepower with the exhaust heating equal to about 122,000 B.t.u. per hour at 60 degrees F. dry bulb ambient temperature and the heating capacity is approximately 242,000 B.t.u. per hour at 150 degrees F. dry bulb supplied to the enclosure.

The system of FIG. 7 when used as a ground cart provides air conditioning including cooling, dehumidification, heating and ventilation. Also, pressurized air for engine starting, ground operation of air turbines and other equipment can be obtained through pipe or conduit 288. By generating electricity simultaneously current is obtained for lights, pumps, and other electrical equipment.

The conditioning systems of the invention as shown and described in the application can be used in various combination or subcombinations, in order to achieve the desired purpose. For example, when the system is to be operated in dry climates and dehumidification is not desired or necessary, the equipment of the system for dehumidification can be eliminated, including the reheat exchanger and/or the water separator. In other instances, where cooling only is required and no heating step is necessary, the heat exchanger 272 of FIG. 7 and relative equipment can be eliminated. Likewise, where heating only and no cooling is required then the heat exchanger 294 can be eliminated in FIG. 7. In addition, in some instances pressurized air from sources other than a compressor forming a part of the unit can be used for a source of air to be supplied to the enclosure.

In each of the systems described mixing of the air for temperature and humidity control or adjustment occurs upstream of the expansion turbine which is quite desirable and eliminates provision of mixing air downstream of the turbine where less control is obtained on the temperature and/or humidity of the air. In addition, the water separator is located downstream of the turbine in each instance and preferably the water received or removed in the water separator is re-evaporated in the cooling heat exchanger to substantially improve the efficiency of the unit.

The systems of the invention can be used for office buildings, shopping centers, home air-conditioning and for other stationary enclosures, in automobiles, airplanes, trains, construction vehicles, ships, and other vehicles, for ground support units, missile storage complexes or hardened silos or the like, and in many other applications.

While the invention has been described in connection with preferred specific embodiments thereof, it will be understood that such is intended to illustrate and not to limit the scope of the invention which is defined by the claims.

I claim:

1. A shaft driven air cycle air conditioning system comprising, in combination, a compressor having a housing with an air inlet and an air outlet, a shaft rotatably mounted in said housing and extending from each side thereof, a plurality of vanes connected to said shaft for rotation therewith, said vanes being shaped and positioned to receive air from said air inlet and compress and discharge same from said air outlet during rotation of said shaft, power means connected to one end portion of said shaft extending from said compressor and operable to rotate said shaft in operation, a first T-shaped coupling member having an air inlet and two air outlets with said air inlet being connected in fluid communication with said air outlet of said compressor housing, a heat exchanger having a tubular portion with a high pressure air inlet and a high pressure air outlet intermediate the ends thereof and a low pressure air inlet and a low pressure air outlet at the ends thereof, a plurality of conduits each connected in one end portion to said high pressure air inlet of said heat exchanger and having the other end portion thereof connected to said high pressure air outlet of said heat exchanger with the intermediate portions of said tubes being positioned across the intermediate portion of said tubular portion of said heat exchanger, a blower fan mounted in said tubular portion of said heat exchanger adjacent said low pressure air outlet and positioned downstream from said air tubes therein and operable to draw atmospheric air from said low pressure air inlet into said tubular portion for passage across said air tubes, a water evaporator positioned across the inlet end portion of said tubular portion of said heat exchanger and having a water inlet at an upper portion thereof, said high pressure air inlet of said heat exchanger being operatively connected to one of said outlets of said T-shaped coupling member, a first mixing valve having two inlets and an air outlet, one of said inlets of said valve being operatively connected to the other of said outlets of said T-shaped coupling and the other of said inlets of said valve being operatively connected to said high pressure air outlet of said heat exchanger with said valve being operable to pass air therethrough from said T-shaped coupling, from said heat exchanger, or mix air from said compressor and said heat exchanger and discharge same through said outlet thereof, a thermostat having a heat sensing element operatively connected to said valve to control operation of said valve, a second T-shaped coupling having an air inlet and two air outlets with said air inlet being operatively connected to said outlet of said first mixing valve, a second mixing valve having two air inlets and an air outlet with one of said air inlets of said second mixing valve being operatively connected to one of said air outlets of said second T-shaped coupling, a humidistat having a humidity sensing element positionable in an enclosure and operatively connected to said second mixing valve to control operation of said second mixing valve, a reheat heat exchanger having a tubular portion with a high pressure air inlet and a high pressure air outlet at an intermediate portion thereof and a low pressure air inlet and a low pressure air outlet at opposite end portions thereof, said high pressure air inlet of said reheat heat exchanger being operatively connected to the other of said air outlets of said second T-shaped coupling and said high pressure air outlet of said reheat heat exchanger being operatively connected to the other of said air inlets of said second mixing valve, a plurality of air tubes positioned in said reheat heat exchanger each having the inlet end thereof connected to said high pressure air inlet of said reheat heat exchanger and each of said tubes having the outlet end thereof connected to said high pressure air outlet of said reheat heat exchanger, an air turbine having a housing with an air inlet and an air outlet with said air inlet being operatively connected to said outlet of said second mixing valve, the other end portion of said shaft extending from said compressor housing projecting into said turbine and having a plurality of blades connected thereto for rotation with said shaft with said turbine being operable to receive air under pressure at said air inlet and expand same therein and discharge cooled air from said outlet thereof and with air passing through said turbine engaging said blades and turning said shaft, the outlet of said turbine being operatively connected to said low pressure air inlet of said reheat heat exchanger, said heat sensing element of said thermostat being positioned at said outlet of said turbine, a water separator mounted in said reheat heat exchanger and extending across said tubular portion thereof and positioned between said low pressure air inlet of said reheat heat exchanger and said tubes therein with said water separator being operable to remove moisture from air passing therethrough, a drain pipe connected in one end to said reheat heat exchanger to receive water removed from air passing therethrough by said water separator, a water trap mounted beneath said reheat heat exchanger and having the other end of said drain pipe connected thereto, a conduit connected in one end portion to an upper portion of said water trap and connected in the other end portion to said water inlet of said water evaporator in said heat exchanger, conduit means connected to said low pressure outlet of said reheat heat exchanger and to the enclosure to provide conditioned air thereto from said reheat heat exchanger, said air conditioning system being constructed and adapted so that said power means operates said compressor with air passing through said compressor being compressed and increased in temperature and discharged through said high pressure side of said heat exchanger for cooling therein with said first mixing valve mixing air from said heat exchanger and said compressor in response to temperature conditions in said enclosure and with the air from said first mixing valve being provided to said second mixing valve and said reheat heat exchanger with air from said reheat heat exchanger being provided to said second mixing valve for mixing therein in response to humidity conditions in said enclosure, air from said second mixing valve being provided to said turbine for expansion and cooling therein with cool air from said turbine passing through said water separator to have water removed therefrom and with the air passing across the low pressure side of said reheat heat exchanger and being discharged into said enclosure.

2. A shaft driven air cycle air-conditioning system comprising, in combination, a compressor having an air inlet and an air outlet and being operable to receive air at said air inlet and compress same and discharge the compressed air from said air outlet, power means operatively connected to said compressor for operation of said compressor, a first T-shaped coupling member having an air inlet and two air outlets with said air inlet being operatively connected to said air outlet of said compressor to receive compressed air therefrom, a heat exchanger having a high pressure air inlet and a high pressure air outlet with said air inlet being operatively connected to one of said outlets of said coupling, water evaporator means within said heat exchanger with said heat exchanger being operable to pass air through said water evaporator and across the compressed air passing through the high pressure side thereof to cool the compressed air, a first mixing valve having two air inlets and an air outlet, one of said inlets of said valve being operatively connected to the other of said outlet of said T-shaped coupling and the other of said inlets of said valve being operatively connected to said high pressure air outlet of said heat exchanger with said valve being operable to mix air from said coupling and said heat exchanger, thermostat means having a heat sensing element positionable downstream of said valve and operatively connected to said mixing valve to control operation of said mixing valve, a second T-shaped coupling having an air inlet and two air outlets with said air inlet being operatively connected to said outlet of said first mixing valve, a second mixing valve having two air inlets and an air outlet with one of said air inlets of said mixing valve being operatively connected to one of said air outlets of said second T-shaped coupling, humidistat means having a humidity sensing element positionable in an enclosure and operatively connected to said second mixing valve to control operation of said second mixing valve, a reheat heat exchanger having a high pressure air inlet and a high pressure air outlet with said high pressure air inlet being operatively connected to the other side of said air outlets of said second T-shaped coupling and with said high pressure air outlet of said reheat heat exchanger being operatively connected to the other of said air inlets of said second mixing valve, an air turbine having an air inlet and an air outlet, said air inlet of said turbine being operatively connected to said outlet of said second mixing valve with said turbine being operable to expand air passing therethrough, a water separator having an inlet connected in fluid communication with said outlet of said outlet of said turbine with air from said turbine passing through said water separator for removal of water therefrom, means connected to said water separator and said water evaporator in said heat exchanger to transfer water from said water separator to said water evaporator, said water separator having an outlet connected to the inlet of the low pressure side of said reheat heat exchanger, and conduit means connected to the outlet of said low pressure side of said reheat heat exchanger and connectible to the enclosure to be conditioned to transfer conditioned air thereto, said air-conditioning system being constructed and adapted so that said power means operates said compressor with said compressor receiving, compressing and discharging compressed air to said first T-shaped coupling with air passing from said coupling through said heat exchanger and to said first mixing valve with said first mixing valve mixing air from said coupling and said heat exchanger in response to temperature conditions in the enclosure to be conditioned, air passing from said first mixing valve to said second T-shaped coupling and from said second T-shaped coupling to said second mixing valve and through the high pressure side of said reheat heat exchanger to said second mixing valve with said second mixing valve being operable in response to humidity conditions in the enclosure to be conditioned to mix air from said second T-shaped coupling and said high pressure side of said reheat exchanger and discharge same into said turbine for expansion therein, air from said turbine passing through said water separator for removal of water and transfer of same to said water evaporator in said heat exchanger and with air from said water separator passing through the low pressure side of said reheat heat exchanger and into said conduit means for transfer to the enclosure to be conditioned.

3. Air conditioning means comprising, in combination, an air compressor having an air inlet and an air outlet and being operable to receive and compress air, a heat exchanger having an air inlet and an air outlet with said air inlet being operatively connected to said air outlet of said compressor, first mixing valve means having inlets and an outlet with said inlets being operatively connected to said air outlet of said compressor and to said air outlet of said heat exchanger to receive air therefrom, a reheat heat exchanger having an air inlet and an air outlet with said air inlet being operatively connected to said outlet of said first mixing valve means, second mixing valve means having air inlets and an air outlet with said air inlets being operatively connected to said outlets of said reheat heat exchanger and said first mixing valve means, said second mixing valve means being operable to mix received air from said first mixing valve and said reheat exchanger, a turbine having an inlet and an outlet with said inlet being operatively connected to said outlet of said second mixing valve means, water separator means operatively connected to said outlet of said turbine and operable to remove water from air passing therethrough, and means connected to said water separator means and said reheat heat exchanger to direct air from said water separator means through said reheat heat exchanger.

4. A shaft driven air cycle air conditioning system comprising, in combination, a compressor having a housing with an air inlet and an air outlet, a shaft rotatably mounted in said housing, a plurality of vanes connected to said shaft for rotation therewith, said vanes being shaped and positioned to receive air from said air inlet and compress and discharge same from said air outlet during rotation of said shaft, power means connected to said shaft of said compressor and operable to rotate said shaft in operation, said power means having an air inlet and an exhaust outlet, a first T-shaped coupling member having an air inlet and two air outlets with said air inlet being connected in fluid communication with said air outlet of said compressor, a first heat exchanger having a tubular portion having one end portion thereof connected to said exhaust outlet of said power means to receive hot exhaust gases therefrom and pass same therethrough, said heat exchanger having a high pressure air inlet and a high pressure air outlet and a plurality of conduits positioned in said tubular portion and connected in their end portions to said high pressure air inlet and said high pressure air outlet, said high pressure air inlet being operatively connected to one of said outlets of said T-shaped coupling to receive air from said compressor and pass same therethrough to said first heat exchanger to heat the air passing therethrough, a second heat exchanger having a tubular portion with a high pressure air inlet and a high pressure air outlet intermediate the ends thereof and a low pressure air inlet and a low pressure air outlet at the ends thereof, a plurality of conduits each connected in one end portion to said high pressure air inlet of said second heat exchanger and having the other end portion thereof connected to said high pressure air outlet of said second heat exchanger with the intermediate portions of said tubes being positioned across the intermediate portion of said tubular portion of said second heat exchanger, a blower fan mounted in said tubular portion of said second heat exchanger adjacent said low pressure air outlet and positioned downstream from said air tubes therein and operable to draw atmospheric air from said low pressure air inlet into said tubular portion for passage across said air tubes, a water evaporator positioned across the inlet end portion of said tubular portion of said second heat exchanger and having a water inlet at an upper portion thereof, said high pressure air inlet of said second heat exchanger being operatively connected to the other of said outlets of said T-shaped coupling member, a first mixing valve having two air inlets and an air outlet, one of said inlets of said valve being operatively connected to said high pressure outlet of said first heat exchanger and the other of said inlets of said valve being operatively connected to said high pressure air outlet of said second heat exchanger with said valve being operable to mix air received from said heat exchangers and discharge same through said outlet of said valve, a thermostat having a heat sensing element operatively connected to said valve to control operation of said valve, a second T-shaped coupling having an air inlet and two air outlets wtih said air inlet being operatively connected to said outlet of said first mixing valve, a second mixing valve having two air inlets and an air outlet with one of said air inlets of said second mixing valve being operatively connected to one of said air outlets of said second T-shaped coupling, a humidistat having a humidity sensing element positionable in an enclosure and operatively connected to said second mixing valve to control operation of said second mixing valve, a reheat heat exchanger having a tubular portion with a high pressure air inlet and a high pressure air outlet at an intermediate portion thereof and a low pressure air inlet and a low pressure air outlet at opposite end portions thereof, said high pressure air inlet of said reheat exchanger being operatively connected to the other of said air outlets of said second T-shaped coupling and said high pressure air outlet of said reheat heat exchanger being operatively connected to the other of said air inlets of said second mixing valve, a plurality of air tubes positioned in said reheat heat exchanger each having the inlet end thereof connected to said high pressure air inlet of said reheat heat exchanger and each of said tubes having the outlet end thereof connected to said high pressure air outlet of said reheat heat exchanger, an air turbine having a housing with an air inlet and an air outlet with said air inlet being operatively connected to said outlet of said second mixing valve, said compressor shaft extending into said turbine and having a plurality of blades connected thereto for rotation with said shaft, said turbine being operable to receive air under pressure at said air inlet and expand same therein and discharge cooled air from said outlet thereof and with air passing through said turbine engaging said blades and turning said shaft, the outlet of said turbine being operatively connected to said low pressure air inlet of said reheat heat exchanger, an electric generator positioned around said shaft and having the rotor thereof connected to said shaft, said heat sensing element being positioned at said outlet of said turbine, a water separator mounted in said reheat heat exchanger and extending across said tubular portion thereof and positioned between said low pressure air inlet of said reheat heat exchanger and said tubes therein with said water separator being operable to remove water from air passing therethrough, a drain pipe connected in one end to said reheat heat exchanger to receive water removed from air passing therethrough by said water separator, a water trap mounted beneath said reheat heat exchanger and having the other end of said drain pipe connected thereto, a conduit connected in one end portion to an upper portion of said water trap and connected in the other end portion to said water inlet of said water evaporator in said second heat exchanger, conduit means connected to said low pressure outlet of said reheat heat exchanger and to the enclosure to provide conditioned air thereto from said reheat heat exchanger, the air conditioning system being constructed and adapted so that said power means operates said compressor and turns said rotor of said generator with air passing through said compressor being compressed and increased in temperature and discharged through said high pressure sides of said heat exchangers for heating in said first heat exchanger and cooling in said second heat exchanger with said first mixing valve mixing air from said heat exchangers in response to temperature conditions in the enclosure and with the air from said first mixing valve being provided to said second mixing valve and said reheat heat exchanger with air from said reheat heat exchanger being provided to said second mixing valve for mixing therein in response to humidity conditions in the enclosure, air from said second mixing valve being provided to said turbine for expansion and cooling therein with cool air from said turbine passing through said water separator to have water removed therefrom and with the air passing across the low pressure side of said reheat heat exchanger and being discharged into the enclosure.

5. An air cycle air conditioning system comprising, in combination, a compressor having an air inlet and an air outlet and being operable to receive air at said air inlet and compress same therein and discharge compressed air from said air outlet, power means operatively connected to said compressor for operation of said compressor, said power means having an exhaust outlet, first heat exchanger means having a high pressure inlet operatively connected to the outlet of said compressor and positioned relative to said exhaust of said power means to receive exhaust gases therefrom at the low pressure inlet of said heat exchanger means to heat air from said compressor passing through said heat exchanger means, second heat exchanger means operatively connected to said outlet of said compressor and having means therewith to draw relatively cool air therethrough to cool air from said compressor passing through said second heat exchanger means, first mixing valve means having air inlets operatively connected to the air outlets of said heat exchanger means to receive compressed air therefrom with said mixing valve means being operable to mix air received from said first and second heat exchanger means, thermostat means having a heat sensing element operatively connected to said first mixing valve means operable to regulate said mixing valve means, a reheat heat exchanger having a high pressure air inlet operatively connected to the outlet of said first mixing valve means and having a low pressure air inlet and outlet, second mixing valve means having inlets operatively connected to the outlet of said first mixing valve means and the high pressure outlet of said reheat heat exchanger and being operable to mix air therefrom, humidity sensing means operatively connected to said second mixing valve means and operable to regulate same, a turbine connected to the outlet of said second mixing valve means and being operable to expand air passing therethrough, water separator means operatively connected to the outlet of said turbine means and connected to said low pressure inlet of said reheat heat exchanger, and means connected to said low pressure outlet of said low pressure side of said reheat heat exchanger to transfer air received therefrom to an enclosure to be conditioned.

6. Air cycle air-conditioning means comprising, in combination, first heat exchanger means operable to receive and heat air, second heat exchanger means operable to receive and cool air, means operatively connected to said first and second heat exchanger means operable to provide air under pressure thereto, first mixing valve means operatively connected to said first and second heat exchanger means operable to receive air under pressure therefrom and mix same therein, second mixing valve means operatively connected to the outlet of said first mixing valve means, a reheat heat exchanger having the inlet of the high pressure side thereof connected to the outlet of said first mixing valve means and having the outlet of said high pressure side thereof connected to said second mixing valve means, said second mixing valve means being operable to mix air from said first mixing valve means and said reheat heat exchanger, turbine means operatively connected to the outlet of said second mixing valve means and operable to receive air therefrom and expand same to decrease the temperature and pressure thereof, and means operatively connected to the outlet of said turbine to remove water from air received therefrom with the outlet of said last-named means being operatively connected to the low pressure inlet of said reheat heat exchanger to direct cool air thereto.

7. Means to condition air to be provided to an enclosure or the like comprising, in combination, a heat exchanger, means operatively connected to said heat exchanger operable to provide air under pressure thereto, first mixing valve means operatively connected to the outlet of said heat exchanger and to said means for providing air under pressure thereto with said mixing valve means being operable to mix air therefrom, second mixing valve means operatively connected to the outlet of said first mixing valve means, a reheat heat exchanger having the high pressure inlet thereof operatively connected to the outlet of said first mixing valve means and the high pressure outlet thereof connected to said second mixing valve means, said second mixing valve means being operable to mix air from said first mixing valve means and said reheat heat exchanger, turbine means operatively connected to the outlet of said second mixing valve means and operable to receive air therefrom and expand same to decrease the temperature and pressure thereof, means operatively connected to the outlet of said turbine to remove water from air received therefrom with the outlet of said last-named means being operatively connected to the low pressure inlet of said reheat heat exchanger, and means connected to the low pressure outlet of said reheat heat exchanger operable to pass air therefrom to an enclosure to be conditioned.

8. Means to condition gaseous fluid comprising, in combination, heat exchanger means having an inlet and an outlet, means operatively connected to said heat exchanger means operable to provide gaseous fluid under pressure thereto, mixing means operatively connected to the outlet and to the inlet of said heat exchanger means and having means connectible to means for providing gaseous fluid under pressure to said mixing means with said mixing means being operable to selectively mix gaseous fluid streams for separately selectively controlling the temperature and for separately selectively controlling the humidity thereof, expansion means operatively connected to said mixing means and operable to receive gaseous fluid therefrom and expand same and decrease the temperature and pressure thereof, and means operatively connected to said expansion means to receive gaseous fluid therefrom.

9. The means to condition air as defined in claim 8 wherein said means operatively connected to said expansion means has water separator means therein operable to remove water from air passing therethrough.

10. Means of controlling the temperature and humidity of air provided to an enclosure comprising, means for drawing air from the atmosphere into a compressor and compressing the air therein and discharging same therefrom at an increased temperature and pressure, means for heating a portion of the compressed air by directing compressed air from the compressor through conduits in the high pressure side of a first heat exchanger with the low pressure side of the heat exchanger simultaneously receiving hot air from the exhaust of a power supply, means for evaporating water at the inlet of the low pressure side of a second heat exchanger to thereby cool atmospheric air passing therethrough, means for cooling a portion of the compressed air by directing compressed air from the compressor through conduits in the high pressure side of the second heat exchanger while simultaneously drawing cooled atmospheric air through the low pressure side of the second heat exchanger, means for providing air from both heat exchangers to a first mixing valve and mixing same therein in response to temperature conditions downstream thereof, means for passing air from the first mixing valve through conduits in the high pressure side of a reheat heat exchanger, means for providing air from the first mixing valve and from the reheat heat exchanger to a second mixing valve and mixing same therein in response to humidity conditions in the enclosure to be conditioned, means for passing the air from the second mixing valve to an expansion turbine and expanding same therein to lower the temperature and pressure thereof, means for passing air from the turbine through a water separator and removing water from the air, means for transferring the water removed from the air in the separator to the water evaporator in the second heat exchanger for evaporation therein, passing air from the water separator through the low pressure side of the reheat heat exchanger to warm same, and means for discharging air from the low pressure side of the reheat heat exchanger into the enclosure to be conditioned.

11. Means of controlling the temperature and humidity of air provided to an enclosure comprising, means for filtering air and passing same into a means for compressor, compressing the filtered air in the compressor and discharging the air therefrom at an increased temperature and pressure, means for drawing atmospheric air into the low pressure side of a heat exchanger and passing same through a water evaporator to cool the atmospheric air and then passing the cooled air across conduits of the high pressure side of the heat exchanger and discharging the low pressure air to the atmosphere, means for cooling compressed air from the compressor by directing same through the conduits in the high pressure side of the heat exchanger, means for providing air from the compressor and the outlet of the conduits of the heat exchanger to a first mixing valve and mixing same therein, means for passing air from the mixing valve through conduits in the high pressure side of a reheat heat exchanger, means for providing air from the first mixing valve and from the reheat heat exchanger to a second mixing valve and mixing same therein in response to humidity conditions in the enclosure to be conditioned, means for passing the air from the second mixing valve to a turbine and expanding same therein to lower the temperature and pressure thereof, means for passing air from the turbine through a water separator and removing water therefrom, means for transferring the water removed from the air in the water separator to the water evaporator in the heat exchanger for evaporation therein, means for passing air from the water separator through the low pressure side of the reheat heat exchanger to warm same, and means for discharging air from the low pressure side of the reheat heat exchanger into the enclosure to be conditioned.

12. Means of controlling temperature and humidity of air provided to an enclosure comprising, means for passing air into a compresor and compressing same therein and discharging the air therefrom at an increased temperature and pressure, means for cooling air from the compressor by directing the compressed air through conduits in the high pressure side of a heat exchanger and simultaneously passing cooler air through the low pressure side of the heat exchanger and across the conduits, means for providing air from the compressor and the heat exchanger high pressure side to a mixing valve and mixing same therein, means for passing air from the first mixing valve through the high pressure side of a reheat heat exchanger, means for providing air from the first mixing valve and the reheat heat exchanger to a second mixing valve and mixing same therein in response to humidity conditions in the enclosure to be conditioned, means for passing the air from the second mixing valve to an expansion turbine and expanding same therein to lower the temperature and pressure thereof, means for removing water from the air leaving the turbine, means for heating the air by passing the air across the low pressure side of the reheat heat exchanger, and means for discharging the air from the low pressure side of the reheat exchanger into the enclosure to be conditioned.

13. Means of controlling the temperature and humidity of air provided to an enclosure comprising, means for compressing air to thereby increase the temperature and pressure thereof, means for directing the compressed air to heat exchanger means and changing the temperature of the compressed air therein, means for mixing the air from the heat exchanger means and from the compressor and providing the resulting mixture of air to reheat heat exchanger means, means for mixing air from the first mixing stage and from the reheat heat exchanger means and providing same to a turbine, means for expanding the air in the turbine to decrease the pressure and temperature thereof, means for removing water from the cooled air and heating the resulting dried air, and means for discharging the air into the enclosure to be conditioned.

14. Means of controlling the temperature and humidity of air for an enclosure comprising, means for compressing air to increase the temperature and pressure thereof, means for mixing the compressed air with air from heat exchanger means, means for mixing the resulting air with air from a reheat heat exchanger, means for expanding the resulting air in a turbine to decrease the temperature and pressure thereof, means for removing moisture from the cooled air, and means for heating the air in the reheat heat exchanger.

15. Means to condition gaseous fluid comprising, in combination, heat exchanger means having an inlet and an outlet and having a high pressure side and a low pressure side, means operatively connected to the inlet of said heat exchanger means operable to provide gaseous fluid under pressure thereto, mixing means operatively connected to the outlet of said heat exchanger means and having means connectible to means for providing gaseous fluid under pressure to said mixing means with said mixing means being operable to selectively mix gaseous fluid streams, expansion means operatively connected to said mixing means and operable to receive gaseous fluid therefrom and expands same and decrease the temperature and pressure thereof, means operatively connected to said expansion means to receive gaseous fluid therefrom and including water separator means operable to remove water from air passing therethrough, water evaporator means disposed in the low pressure side of said heat exchanger means, and conduit means operatively connected to said water evaporator means and to said water separator means for conducting water from said water separator means to said water evaporator means for evaporation in the low pressure side of said heat exchanger means and to cool air passing through said heat exchanger means.

References Cited by the Examiner

UNITED STATES PATENTS

| | | | |
|---|---|---|---|
| 2,293,557 | 8/1942 | Newton | 62—173 |
| 2,409,159 | 10/1946 | Singleton | 62—402 |
| 2,691,274 | 10/1954 | Witney | 62—172 |
| 2,856,758 | 10/1958 | Eggleston | 62—172 |
| 2,902,836 | 9/1959 | Le May | 62—172 |
| 2,961,939 | 11/1960 | Typaldos | 62—172 |
| 3,012,413 | 12/1961 | Anderson | 62—402 |

WILLIAM J. WYE, *Primary Examiner.*

ROBERT A. O'LEARY, *Examiner.*